(12) United States Patent
Eckert

(10) Patent No.: US 10,518,732 B2
(45) Date of Patent: Dec. 31, 2019

(54) AIRBAG DEVICES DESIGNED TO UTILIZE A REDUCED INTERIOR SURFACE AREA OF A VEHICLE

(71) Applicant: Byton Limited, Hong Kong (HK)

(72) Inventor: Christopher Eckert, San Jose, CA (US)

(73) Assignee: Byton Limited, Hong Kong (HK)

( * ) Notice: Subject to any disclaimer, the term of this patent is extended or adjusted under 35 U.S.C. 154(b) by 0 days.

(21) Appl. No.: 15/669,693

(22) Filed: Aug. 4, 2017

(65) Prior Publication Data

US 2019/0039550 A1 Feb. 7, 2019

(51) Int. Cl.
*B60R 21/20* (2011.01)
*B60R 21/203* (2006.01)
*B60R 21/205* (2011.01)
*B60R 21/217* (2011.01)

(52) U.S. Cl.
CPC ............ *B60R 21/20* (2013.01); *B60R 21/203* (2013.01); *B60R 21/205* (2013.01); *B60R 21/2032* (2013.01); *B60R 21/2171* (2013.01)

(58) Field of Classification Search
CPC ... B60R 21/20; B60R 21/203; B60R 21/2032; B60R 21/205; B60R 21/2171
See application file for complete search history.

(56) References Cited

U.S. PATENT DOCUMENTS

| | | | | |
|---|---|---|---|---|
| 3,669,465 A | * | 6/1972 | Vacante | B60R 21/2032 180/78 |
| 3,680,884 A | * | 8/1972 | Stephenson | B60R 21/2032 280/731 |
| 3,744,817 A | * | 7/1973 | Ousset | B60R 21/2032 280/730.1 |
| 5,085,465 A | * | 2/1992 | Hieahim | B60R 21/30 280/738 |
| 5,609,356 A | * | 3/1997 | Mossi | B60R 21/2032 280/728.1 |
| 5,722,686 A | * | 3/1998 | Blackburn | B60R 21/21658 280/731 |

(Continued)

FOREIGN PATENT DOCUMENTS

| CN | 106926806 A | 7/2017 |
|---|---|---|
| CN | 108583498 A | 9/2018 |

(Continued)

OTHER PUBLICATIONS

International Search Report and the Written Opinion of the International Searching Authority for International Application No. PCT/2018/000972 dated Feb. 7, 2019.

(Continued)

*Primary Examiner* — Laura Freedman
(74) *Attorney, Agent, or Firm* — Womble Bond Dickinson (US) LLP

(57) ABSTRACT

Systems and devices for implementing airbags within vehicles are described herein with the airbags being designed to utilize a reduced interior surface area of a vehicle. In one embodiment, an airbag device for a vehicle, comprises an airbag capable of being deployed upon detection of a collision condition for the vehicle and a container to contain the airbag prior to deployment. In one example, the container has a depth that exceeds a diameter of the container.

13 Claims, 5 Drawing Sheets

(56) References Cited

U.S. PATENT DOCUMENTS

| | | | | |
|---|---|---|---|---|
| 5,893,580 | A * | 4/1999 | Hoagland | B60R 21/2032 280/731 |
| 5,947,514 | A * | 9/1999 | Keller | B60R 21/01512 280/735 |
| 6,189,919 | B1 * | 2/2001 | Sinnhuber | B60R 21/2032 188/377 |
| 6,394,489 | B1 * | 5/2002 | Faigle | B60R 21/2035 280/731 |
| 7,287,618 | B2 * | 10/2007 | Okamoto | B60R 21/36 180/274 |
| 7,293,795 | B2 * | 11/2007 | Kong | B60H 1/00507 280/728.3 |
| 7,325,827 | B2 * | 2/2008 | Reiter | B60H 1/00564 280/732 |
| 7,931,296 | B2 * | 4/2011 | Choi | B60R 21/2032 280/728.2 |
| RE43,413 | E * | 5/2012 | Sinnhuber | B60R 21/2032 280/731 |
| 9,409,538 | B2 * | 8/2016 | Gorman | B60H 1/00592 |
| 9,550,514 | B2 * | 1/2017 | Schulz | B62D 1/183 |
| 10,144,382 | B2 * | 12/2018 | Shanks | B60R 21/203 |
| 2003/0001366 | A1 * | 1/2003 | Debler | B60H 1/0055 280/732 |
| 2009/0189373 | A1 | 7/2009 | Schramm et al. | |
| 2012/0074674 | A1 | 3/2012 | Ohoka et al. | |
| 2016/0001807 | A1 | 1/2016 | Hans et al. | |
| 2017/0072984 | A1 | 3/2017 | Gong | |
| 2019/0071112 | A1 * | 3/2019 | Toddenroth | B62D 1/105 |

FOREIGN PATENT DOCUMENTS

| | | | |
|---|---|---|---|
| DE | 4225709 A1 * | 2/1994 | B60R 21/26 |
| EP | 1249373 A2 | 10/2002 | |
| EP | 2033850 A2 | 3/2009 | |
| JP | 2010036882 A | 2/2010 | |

OTHER PUBLICATIONS

Non-Final Office Action for U.S. Appl. No. 15/696,143; dated Apr. 8, 2019; 20 pp.

* cited by examiner

AIRBAG DEVICES DESIGNED TO UTILIZE A REDUCED INTERIOR SURFACE AREA OF A VEHICLE

FIELD

Embodiments of the invention pertain to airbag devices that are designed to utilize a reduced interior surface area of a vehicle.

BACKGROUND

An airbag is typically positioned in a steering wheel or glove box of a vehicle to protect occupants of the vehicle, in case of emergency, such as a vehicle collision. An airbag is rapidly inflated or deployed by a pressure of a gas from a gas generator called an inflator, to protect an occupant. FIG. 1 shows an example of a conventional driver's airbag module. A front view of the airbag module 150a is positioned at a center region 180 of a steering wheel 110. A rear view of the airbag module 150b illustrates connections for horn switch connector 160 and airbag connector 120. An airbag module screw 155 attaches the airbag module to the steering wheel. The airbag module has a length 152 and a width 153 that are each significantly greater than a depth 154.

An airbag of the airbag module 150a, 150b is folded to be deployable, and covered by a module cover. The module cover is torn and broken by an inflating pressure of the airbag in case the airbag is deployed by a generated gas from an inflator.

SUMMARY

For one embodiment of the present invention, systems and devices for implementing airbags within vehicles are described herein. The airbags are designed to utilize a reduced interior surface area of a vehicle. An airbag device for a vehicle includes an airbag capable of being deployed upon detection of a collision condition for the vehicle and a container to contain the airbag prior to deployment. In one example, the container has a depth that exceeds a diameter of the container.

Other features and advantages of embodiments of the present invention will be apparent from the accompanying drawings and from the detailed description that follows below.

BRIEF DESCRIPTION OF THE DRAWINGS

Embodiments of the present invention are illustrated by way of example and not limitation in the figures of the accompanying drawings, in which like references indicate similar elements, and in which.

DETAILED DESCRIPTION

Systems and devices for implementing airbags within vehicles are described herein with the airbags being designed to utilize a reduced interior surface area of a vehicle.

In one embodiment, an airbag device for a vehicle, comprises an airbag capable of being deployed upon detection of a collision condition for the vehicle and a container to contain the airbag prior to deployment. In one example, the container has a depth that exceeds a diameter of the container to provide a sufficient large airbag for protection of occupants during a collision while also reducing an interior surface area that is needed for deployment of the airbag within the vehicle.

Figure 2:
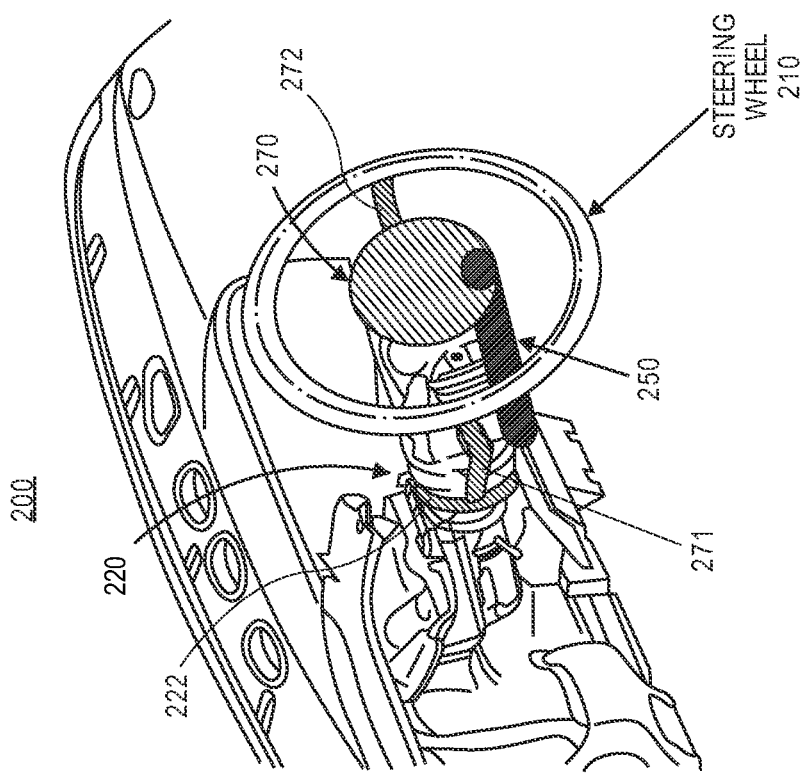
FIG. 2 shows an airbag device positioned within a steering column of a vehicle in accordance with one embodiment.

FIG. 2 shows an airbag device positioned within a steering column of a vehicle in accordance with one embodiment. A vehicle 200 includes a steering column 220, an airbag device 250, a steering wheel 210, and a center region 270 (e.g., hub, pad) of a steering wheel. The steering wheel 210, supports 271 and 272, and lower region 222 of the steering column 220 can rotate automatically for an autonomous vehicle or based on input from a driver. The center region 270 does not rotate. The airbag device 250 is positioned within the steering column 220 as illustrated in FIG. 2 and can be deployed through any portion of the center region. FIG. 2 illustrates the airbag device being positioned in a lower region of the center region. In another example, the airbag device 250 is positioned adjacent to the steering column and a major axis of the airbag device having a depth or height that runs parallel with a major axis of the steering column.

Figure 1:
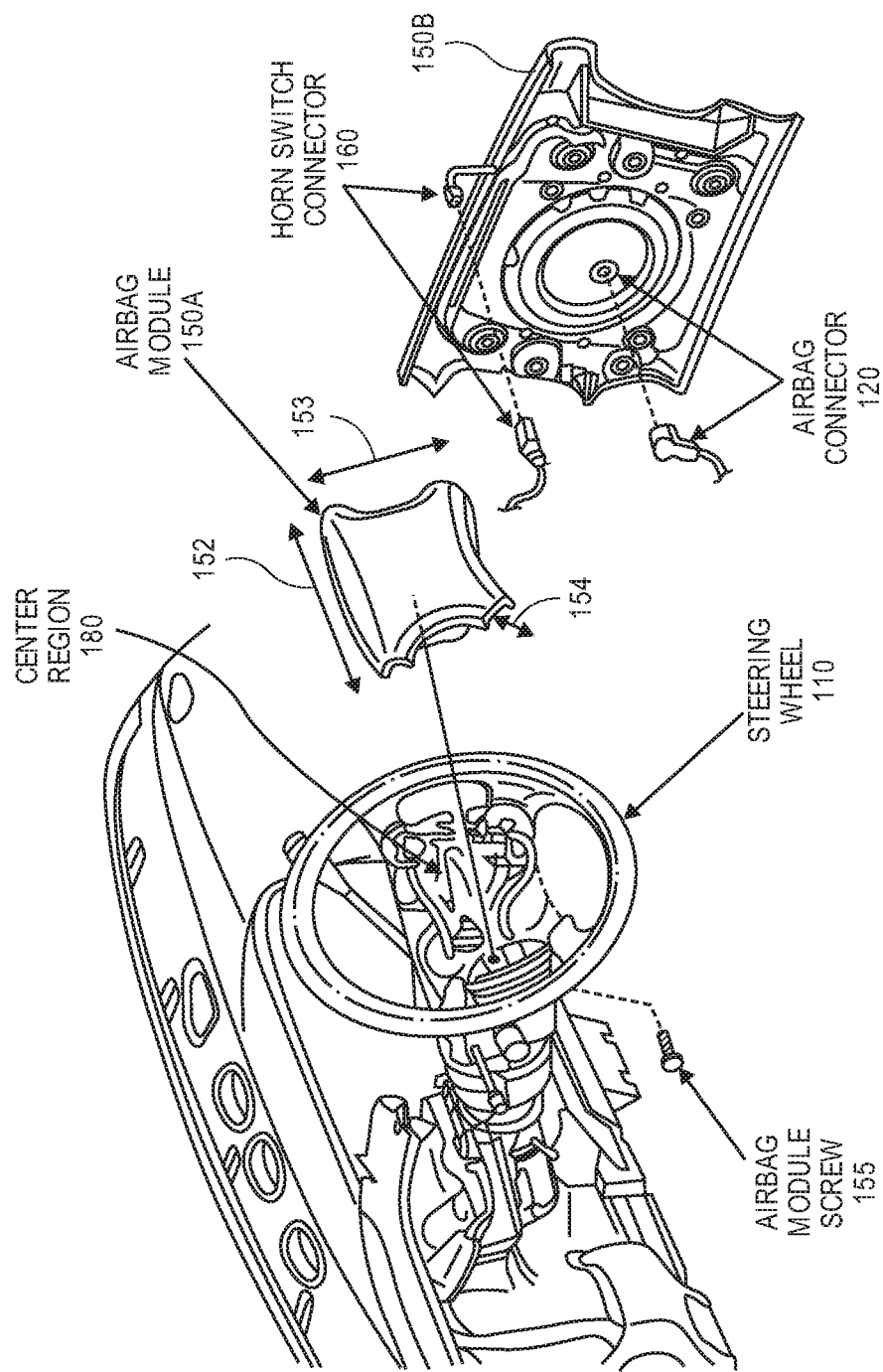
FIG. 1 shows an example of a conventional driver's airbag module.
Figure 3A:
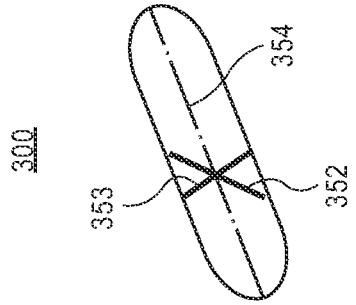
FIG. 3A illustrates a perspective view of an airbag device in accordance with one embodiment.
Figure 3B:
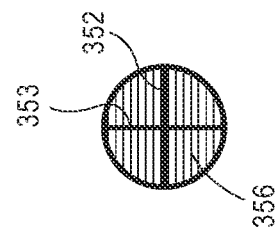
FIG. 3B illustrates a top view of an airbag device in accordance with one embodiment.

FIG. 3A illustrates a perspective view of an airbag device in accordance with one embodiment. The airbag device 300 includes a minor axis 352, a minor axis 353, and a major axis 354 (or depth, height). The minor axis may be a diameter of a circle or a shortest diameter of an ellipse. The major axis 354 (e.g., 100-200 mm, 150 mm) has a significantly greater length than the minor axis in order to reduce a cross-sectional surface area 356, which minimizes interior surface area of a vehicle as illustrated in a top view of the airbag device 300 in FIG. 3B. The airbag device 300 can be positioned in numerous locations within a vehicle due to utilizing a reduced surface area in comparison to conventional airbags having length and width dimensions that exceed a depth dimension.

Figure 4:
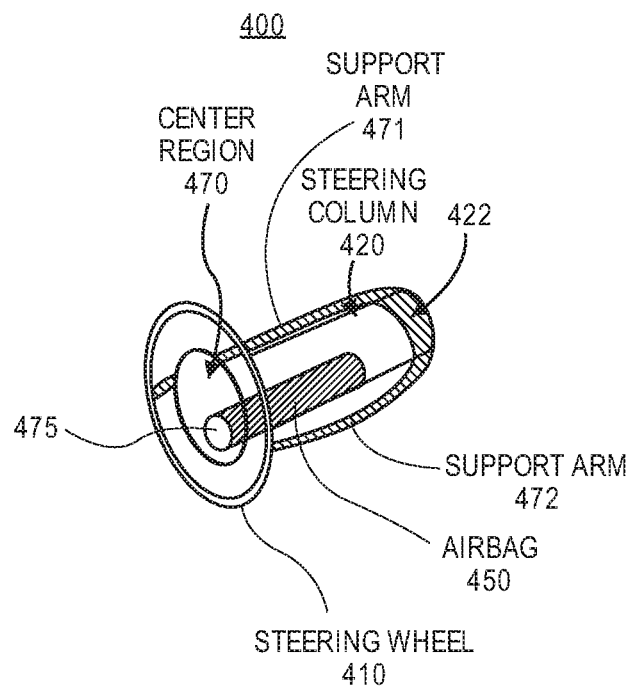
FIG. 4 shows a side view of an airbag device positioned within a steering column of a vehicle in accordance with one embodiment.

FIG. 4 shows a side view of an airbag device positioned within a steering column of a vehicle in accordance with one embodiment. A vehicle 400 includes a steering column 420, an airbag device 450, a steering wheel 410, and a center region 470 of a steering wheel. The steering wheel 410, supports 471 and 472, and lower region 422 of the steering column 420 can rotate automatically for an autonomous vehicle or based on input from a driver. The center region 470 does not rotate. The airbag device 450 is positioned within the steering column 420 as illustrated in FIG. 4 and can be deployed through a lower region of the center region. The airbag device is deployed through an interior surface area 475 of the center region 470. The interior surface 475 utilized by the airbag device is less than a typical surface area for deploying a standard airbag that is shaped like a cube or rectangle with a length and a width being greater than a depth. In another example, the airbag device 450 is positioned adjacent to the steering column and a major axis of the airbag device having a depth runs parallel with a major axis of the steering column.

For an autonomous vehicle, the steering wheel can be positioned further from an occupant. Due to this greater distance from the steering wheel to an occupant, a larger airbag device may be needed to protect the occupant during an impact or collision condition for the vehicle. In one example, the steering wheel and airbag are 300-400 millimeters from an occupant. A 100 liter air bag has a cross-sectional area of approximately 25 millimeters$^2$ and a depth of approximately 100-200 millimeters. Variable dimensions of the airbag device are determined based on a volume needed for safety of an occupant. The steering column does not include a mechanical drive shaft. Instead, a drive by wire system is utilized thus allowing space for an airbag device within the steering column.

Figure 5:
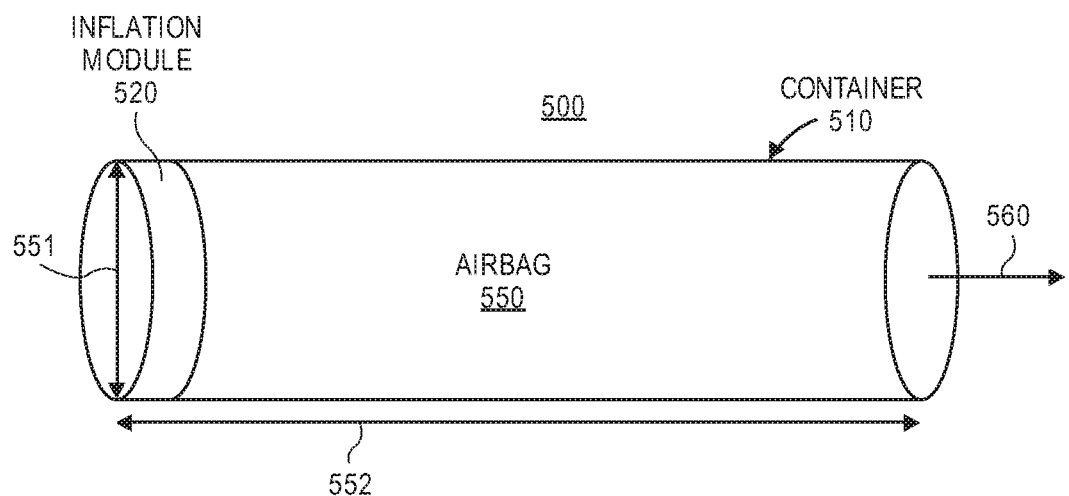
FIG. 5 illustrates an airbag device 500 in accordance with one embodiment.

FIG. 5 illustrates an airbag device 500 in accordance with one embodiment. The device 500 includes a container 510 (e.g., housing) having a diameter 551 and a depth or height 552 that contains an inflation module 520 and an airbag 550. Upon detection of impact or collision, a control module causes the inflator 520 to rapidly inflate the airbag 550 (e.g., airbag pack) that is expelled in a direction 560 towards an occupant of a vehicle.

Figure 6:
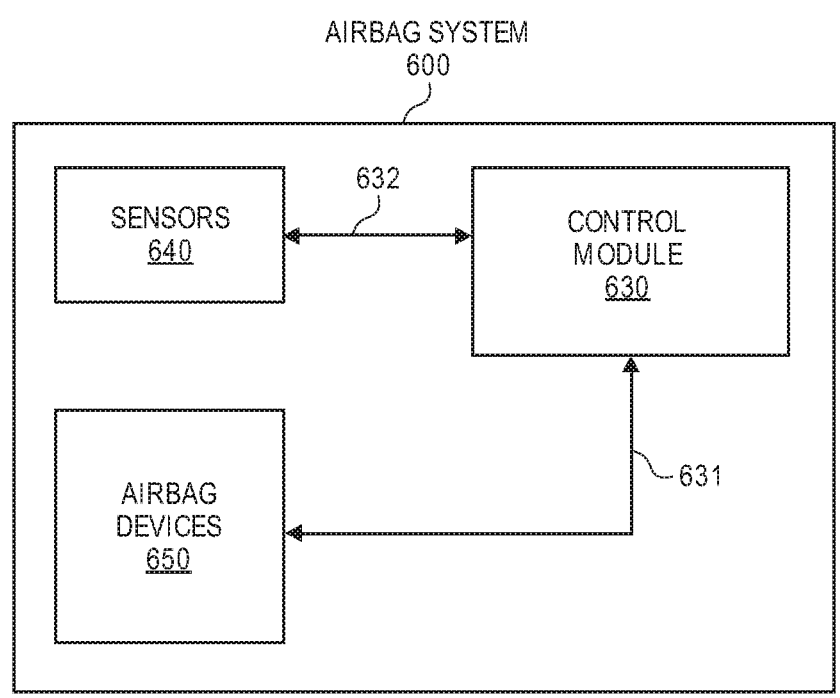
FIG. 6 illustrates a block diagram of an airbag system in accordance with one embodiment.

FIG. 6 illustrates a block diagram of an airbag system 600 in accordance with one embodiment. The system 600 includes a control module 630 (e.g., airbag control module) that receives information via communication link 632 from one or more sensors 640 (e.g., impact sensors, accelerometers, pressure sensors, wheel speed sensors, gyroscopes, brake pressure sensors, seat occupancy sensors, etc.). An impact condition or collision condition may be determined by the control module based on output from the sensors and calculations relating to angle of impact, the severity, or force of the crash, along with other variables. Depending on the result of these calculations, the control module may deploy one or more airbags and may also deploy various additional restraint devices. In response to detection of an impact or collision condition signal, the control module sends via communication link 631 an airbag activation signal to at least one airbag device of the airbag devices 650. At least one airbag device is then deployed. The control module 630 can be positioned in different locations (e.g., under occupant seat, center console, kick panel, under audio electronics, within a steering column) within a vehicle.

Figure 7:
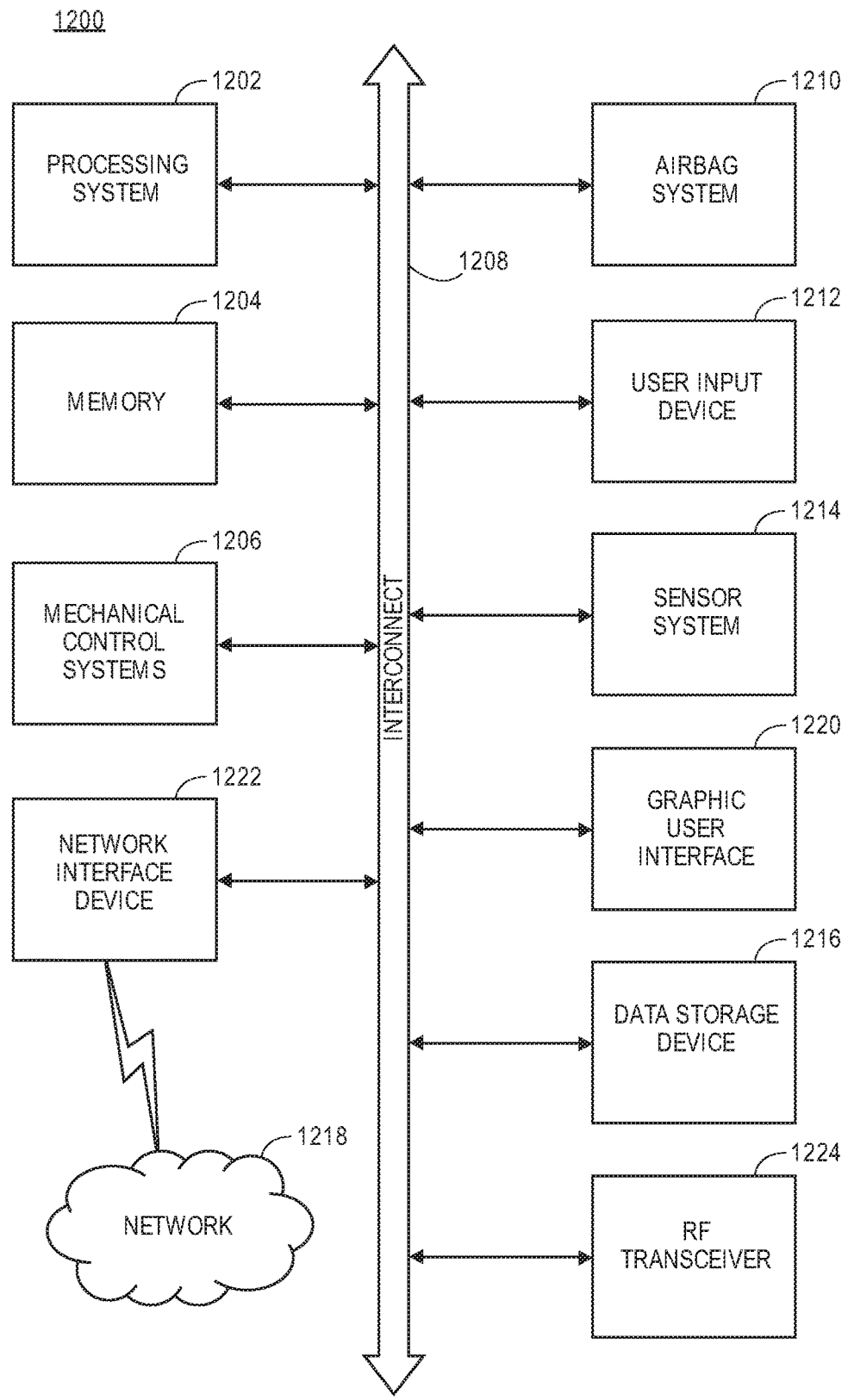
FIG. 7 is a diagram of a computer system 700 of an autonomous vehicle in accordance with one embodiment.

FIG. 7 is a diagram of a computer system 1200 of an autonomous vehicle according to an embodiment of the invention. Within the computer system 1200 is a set of instructions for causing the autonomous vehicle to perform any one or more of the features and functions discussed herein. In one example, the autonomous vehicle may be connected (e.g., networked) to other machines or autonomous vehicles in a LAN or the Internet. The autonomous vehicle can transmit communications (e.g., across the Internet, any wireless communication) to indicate current conditions (e.g., a collision condition indicates that a collision has occurred and at least one airbag has been deployed). The autonomous vehicle can operate in the capacity of a server or a client in a client-server network environment, or as a peer machine in a peer-to-peer (or distributed) network environment.

The system 1200 includes processing system 1202 (e.g., one or more processors or processing devices (e.g., microprocessor, central processing unit, or the like)), a memory 1204 (e.g., read-only memory (ROM), flash memory, dynamic random access memory (DRAM) such as synchronous DRAM (SDRAM) or DRAM (RDRAM), flash memory, static random access memory (SRAM), etc.), and a data storage device 1216 (e.g., a secondary memory unit in the form of a drive unit, which may include fixed or removable computer-readable storage medium), which communicate with each other via a bus 1208. The storage units disclosed in computer system 1200 may be configured to implement data storing mechanisms for performing the operations of autonomous vehicles.

The computer system 1200 may further include an airbag system 1210 (e.g., airbag system 600) having sensors, a control module, and airbag devices as discussed for airbag system 600. The computer system 1200 also includes sensor system 1214 and mechanical control systems 1206 (e.g., motors, driving wheel control, brake control, throttle control, etc.). The processing system 1202 executes software instructions to perform different features and functionality (e.g., driving decisions) and provide a graphical user interface 1220 for an occupant of the vehicle. The processing system 1202 performs the different features and functionality for autonomous operation of the vehicle based at least partially on receiving input from the sensor system 1214 that includes laser sensors, cameras, radar, GPS, and additional sensors.

The computer system 1200 may further include a network interface device 1222. The computer system 1200 also may include an input device 1212 (e.g., touch input, voice activation device, etc.) and a Graphic User Interface (GUI) device 1220 (e.g., a touch-screen with input & output functionality).

The computer system 1200 may further include a RF transceiver 1224 that provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/de-interleaving, spreading/dispreading, inverse fast Fourier transforming (IFFT)/fast Fourier transforming (FFT), cyclic prefix appending/removal, and other signal processing functions.

The Data Storage Device 1216 may include a machine-readable storage medium (or more specifically a computer-readable storage medium) on which is stored one or more sets of instructions embodying any one or more of the methodologies or functions described herein. Disclosed data storing mechanism may be implemented, completely or at least partially, within the memory 1204 and/or within the processing system 1202 by the computer system 1200, the memory 1204 and the processing system 1202 also constituting machine-readable storage media.

The computer-readable storage medium 1224 may also be used to one or more sets of instructions embodying any one or more of the methodologies or functions described herein. While the computer-readable storage medium 1224 is shown in an exemplary embodiment to be a single medium, the term "computer-readable storage medium" should be taken to include a single medium or multiple media (e.g., a centralized or distributed database, and/or associated caches and servers) that stores the one or more sets of instructions. The terms "computer-readable storage medium" shall also be taken to include any medium that is capable of storing or encoding a set of instructions for execution by the machine and that cause the machine to perform any one or more of the methodologies of the present invention. The term "computer-readable storage medium" shall accordingly be taken to include, but not be limited to, solid-state memories, and optical and magnetic media.

In the foregoing specification, the invention has been described with reference to specific exemplary embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. An airbag device for a vehicle, comprising:
    an airbag capable of being deployed upon detection of a collision condition for the vehicle; and
    a container to contain the airbag prior to deployment with the container having a depth that exceeds a diameter of the container, wherein the container containing the airbag is located within a steering column of the vehicle and positioned in a lower region of the steering column, wherein the airbag is capable of being deployed through a center region of a steering wheel of the vehicle upon detection of the collision condition, wherein the steering column is a non rotating drive by wire steering column, and wherein a position and an orientation of the airbag device is constant during rotation of the steering wheel.

2. The airbag device of claim 1, wherein the container comprises a tubular, cylindrical, or conical container.

3. The airbag device of claim 1, wherein an end of the container having the diameter is in plane with respect to a surface within an interior of the vehicle.

4. The airbag device of claim 1, wherein the container containing the airbag has a major axis that exceeds a minor axis of the container.

5. A steering column of a vehicle, comprising:
    an external housing; and
    an airbag device comprising an inflation module and an airbag contained within the external housing, wherein the airbag device is contained within the external housing of the steering column and positioned in a lower region of the steering column, wherein the airbag is capable of being deployed by the inflation module through a center region of a steering wheel upon detection of a collision condition for the vehicle, wherein the steering column is a non-rotating drive by wire steering column, and a position and an orientation of the airbag device is constant during rotation of the steering wheel.

6. The steering column of claim 5, wherein the airbag device has a depth that exceeds a diameter of the airbag device.

7. The steering column of claim 5, wherein the airbag device comprises a tubular, cylindrical, or conical airbag device.

8. The steering column of claim 5, wherein the airbag device has a major axis that exceeds a minor axis of the airbag device.

9. An airbag system for a vehicle, comprising:
    a control module to provide safety features; and
    an airbag device coupled to the control module, the airbag device is capable of being deployed upon detection of a collision condition by the control module and the airbag device prior to deployment having a depth that exceeds a diameter of the airbag device, wherein the airbag device comprises an inflation module and an airbag contained within a steering column of the vehicle, wherein the airbag device is positioned in a lower region of the steering column and is capable of being deployed by the inflation module through a center region of a steeling wheel upon detection of the collision condition, wherein the steering column is a non-rotating drive by wire steering column, and a position and an orientation of the airbag device is constant during rotation of the steering wheel.

10. The airbag system of claim 9, further comprising:
    a plurality of sensors coupled to the control module, the plurality of sensors to sense motion data and to transmit the motion data to the control module for detection of the collision condition.

11. The airbag system of claim 9, wherein the airbag device comprises a tubular, cylindrical, or conical airbag device.

12. The airbag system of claim 9, wherein an end of the airbag device having the diameter is in plane with respect to a surface within an interior of the vehicle.

13. The airbag system of claim 9, wherein the airbag device has a major axis that exceeds a minor axis.

* * * * *